April 18, 1950 C. P. SWEENY 2,504,754

CONTROL SYSTEM FOR ELECTROSTATIC BONDING

Filed Sept. 19, 1946

INVENTOR
Charles P. Sweeny

BY Joel L. Stanford
ATTORNEY

WITNESS:
N. Leszczak

Patented Apr. 18, 1950

2,504,754

UNITED STATES PATENT OFFICE 2,504,754

CONTROL SYSTEM FOR ELECTROSTATIC BONDING

Charles P. Sweeny, Somerville, N. J., assignor to The Singer Manufacturing Company, Elizabeth, N. J., a corporation of New Jersey Application September 19, 1946, Serial No. 698,059

4 Claims. (Cl. 219—47)

This invention relates to electrostatic heating or bonding of thermoplastic sheet materials and more particularly to a system for controlling the power output of a high-frequency oscillator responsively to the demands of a changing bonding load connected to said oscillator.

In bonding systems in which the material to be bonded is passed through a high-frequency electrostatic field, difficulty has been encountered when attempting to make a uniform bond, due mainly to the variation in the number of plies or thickness of the material encountered. It is recognized also that difficulty in maintaining a uniform bond may be caused by anything that produces a change in the capacitance of the load, such as a change in the dielectric constant of the material. Methods heretofore employed to overcome this difficulty have included variable feed rate, variable frequency, and automatic load-end tuning adjustment. However, in general, these methods have proven to be too slow to follow the very rapid changes in load demand brought about when bonding across seams or under similar conditions. This slowness of response is due to the mechanical inertia of control motors and similar moving parts and to the electrical inertias represented mainly by direct-current changes in relays and reactors.

It is an object of this invention, therefore, to provide in a bonding apparatus a control system for an oscillator which shall have no moving parts and no direct-current relays or reactors and which shall be instantaneously effective to meet the requirements of varying loads.

A further object of this invention is to provide a load-responsive oscillator control in which the control currents are all of radio frequency.

With the above and other objects in view, as will hereinafter appear, the invention comprises the devices, combinations and arrangements of parts hereinafter set forth and illustrated in the accompanying drawings which diagrammatically illustrate a preferred embodiment of the invention, from which the several features of the invention and the advantages attained thereby will be readily understood by those skilled in the art.

Figure 1:
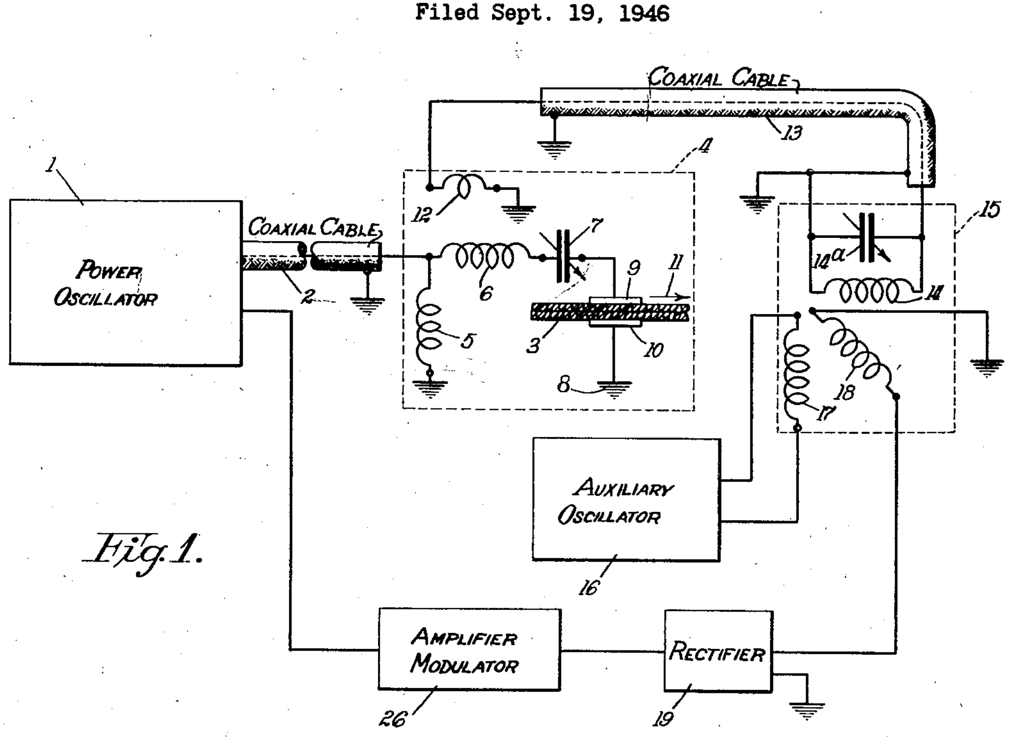
Figure 1 is a schematic diagram of a control system embodying the invention.

Referring to Figure 1 of the drawings, which is mainly schematic, a power oscillator 1, preferably having a very high frequency (60 megacycles per second) output, is connected to one end of a coaxial cable 2 for transmission of energy to a load 3. At the load end of the cable 2 is a tuning device 4, comprising a terminating shunt inductance coil 5, a series tuning inductance 6, and a series tuning condenser 7. In series with said series tuning elements and ground 8 are electrodes 9 and 10 between which is placed the load 3. This load comprises plies of material to be bonded and is fed progressively past the electrodes in a direction shown by the arrow 11.

Thus far, there has been described a high-frequency bonding oscillator with a coaxial cable transmission line, and load-end tuning device and is substantially the same as that shown and described in the copending U. S. application of Joseph P. Graham and Robert D. Lowry, Serial No. 576,657, filed February 7, 1945, now Patent Number 2,473,143, dated June 14, 1949.

As thus described, there is no automatic control of the oscillator power output. For operation with this limited equipment, the condenser 7 is manually adjusted to obtain resonance at some average thickness of the material 3; and, any considerable change in thickness from this value must be met by an appropriate adjustment, in a conventional manner, of the plate voltage supplied to the oscillator to prevent burning on the one hand and insufficient bonding on the other.

However, to give the above circuit the advantages of automatic oscillator control, the following elements, according to the invention, are added to the system:

A suitably grounded pick-up coil 12 is positioned in inductive relation to the tuning inductance 6 and constitutes therewith a current transformer for measuring the current flowing from the oscillator to the load 3. The coil 2 is connected to a coaxial cable 13 preferably of length equal to one-quarter the wave length of the power oscillator frequency. The transmission line 13 terminates in a receiving inductance 14 shunted by a tuning condenser $14^a$ and forming one element of a mixer element 15. It will be understood that a voltage proportional to the current to the load 3 appears across the inductance 14. An auxiliary oscillator 16 generates an alternating voltage of constant magnitude and frequency, preferably of 59 megacycles per second. This voltage is introduced into the mixer by way of an inductance coil 17 which is positioned in non-inductive relation to the coil 14 to prevent "pulling" of the auxiliary oscillator by the power oscillator. A pick-up coil 18 is mounted between coils 14 and 17, in inductive relation to both, and is arranged for adjustable coupling therewith so that the respective component voltages induced in the coil 18 may be relatively controlled as desired. The coil 18 is connected directly to a rectifier 19, the output of which is impressed on an amplifier modulator 26. The output of the amplifier 26 is impressed on the power oscillator 1 to amplitude modulate the output thereof. The rectifier unit 19 is conventional and may be a 6H6 type tube with the plates connected in series to give minimum interelectrode capacity. A conventional Class C amplifier with a pentode driver may be used as the modulator of element 26. Ordinary plate modulation of the power oscillator has been found to be quite satisfactory.

Now, considering the capacitance represented by the load material 3 held between electrodes 9 and 10, the value of said capacitance C is given by the well-known formula $$C=\frac{kA}{1}$$

where $k$ is the dielectric constant and 1 the thickness of the material 3, and A is the effective electrode area, which latter is substantially constant for a given machine. As the material thickness increases, it requires more current into the load to produce satisfactory bonding at the same feed rate. In other words, it is desirable to have the load current vary in a predetermined relation to the variations in the load capacitance and, in general, the current should rise as the load capacitance decreases from a maximum to a minimum value. This inverse relation is also favorable as regards variations in the dielectric constant of the load material because an increased dielectric constant corresponding to increased capacitance, produces an increased loss factor for the material and requires a decreased load current for satisfactory bonding, which decreased current is actually provided by the inverse characteristic described above. That is to say, regardless of whether the change in load capacitance is due to changes in the thickness or in the dielectric constant of the material being bonded, the inverse relation between load current and load capacitance is necessary and desirable in maintaining satisfactory bonding conditions during such changes.

Figure 2:
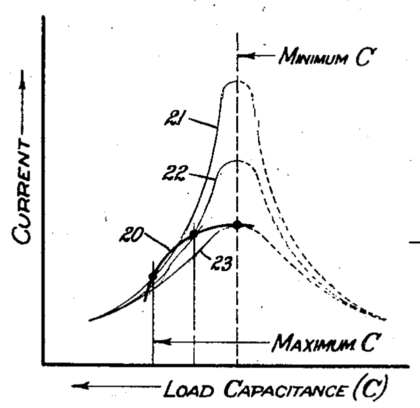
Figure 2 is a graphical representation of the relation of load current to load capacitance, according to the invention.

In operation, the tuning condenser 7 is adjusted to produce resonance with the minimum load capacitance of the material 3 between the electrodes 9 and 10. Thus the load current will be maximum for the minimum capacitance and will decrease for increasing capacitance values. This relation is shown as curve 20 in Figure 2 wherein the individual resonance curves 21, 22 and 23 show the effect on the current of increasing resistance due to greater thickness. This rising current characteristic (curve 20) with decreasing load capacitance is used to advantage, as will be described presently.

The increased current due to closer resonance with the smaller capacitances will not necessarily, of itself, be sufficient to produce a satisfactory bond. It is also necessary to increase the voltage output of the power oscillator with the thicker materials and with materials of smaller dielectric constant to obtain sufficient energy at the bonding area to produce satisfactory fusion of the material. This must be accomplished very rapidly, particularly to follow the variations in thickness encountered when bonding across seams, for example. According to the invention this has been accomplished by modulating the amplitude of the power oscillator output voltage at a beat frequency rate, preferably of approximately 1 megacycle per second, and of a magnitude proportional to the load current.

Thus, as the load current increases due either to increase in the thickness or decrease in the dielectric constant of the material between the electrodes 9 and 10, the derived voltage across coil 14 of the mixer will increase. This voltage combined with the constant voltage from the auxiliary oscillator produces, after rectification in the rectifier 19, a beat frequency voltage of increased magnitude. This is amplified in element 26 and is then impressed preferably on the plate supply of the power oscillator 1 in accordance with well-known conventional plate-modulation methods. As a result, the voltage output of the oscillator will contain a modulation (see Fig. 3) of beat frequency and amplitude proportional to the load current. It is this increased modulation energy which, added to the oscillator energy, will now supply to the load sufficient energy to effect a satisfactory bond.

It has been found that, for a power oscillator frequency of 60 megacycles per second, an auxiliary oscillator frequency of 59 megacycles per second, producing a beat frequency of 1 megacycle per second, is satisfactory and results in reasonable circuit constants. The response is practically instantaneous since no mechanical or electrical inertias are involved in the control circuit, and the control currents are all of radio frequency.

Figure 3:
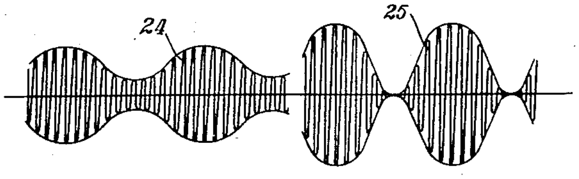
Figure 3 shows the shape of the modulated voltage output from the oscillator for materials of different load capacitance, according to the invention.

Figure 3 shows, as curve 24, the modulated oscillator frequency wave of voltage for material of high capacitance and, as curve 25, the correspondingly increased modulated wave for material of lower capacitance.

Having thus set forth the nature of the invention, what I claim herein is:

1. In a high frequency system, a power oscillator, a variable load connected to receive current from said oscillator, means for deriving a voltage proportional to said load current, a source of stable alternating voltage of fixed frequency, means for beating the derived voltage with said fixed-frequency voltage to obtain a beat-voltage having a frequency equal to the difference between the frequencies of said voltages and having an amplitude proportional to that of said derived voltage, and means for modulating the amplitude of the output voltage of said power oscillator in accordance with said beat-voltage.

2. The method of varying the power output of an oscillator connected to a load, which comprises, deriving a voltage proportional to the amplitude of the load current and having a frequency equal to that of the load current, generating an alternating voltage of constant amplitude and frequency, said frequency being of different value than that of said derived voltage, combining said voltages of different frequencies to produce a beat-frequency voltage, the amplitude of which is proportional to the amplitude of said derived voltage, and amplitude-modulating the oscillator output voltage in accordance with said beat-frequency voltage.

3. The method which comprises as steps, advancing bonding material of varying capacitance through a high-frequency electric field, adjusting reactance values at said electric field to establish current resonance with the bonding material of minimum capacitance in said field, deriving a voltage proportional to the current flow into said field, generating a stable reference voltage of fixed frequency, beating said derived voltage with said reference voltage to produce a beat-voltage proportional to the field current, and modulating the amplitude of said high frequency electric field in accordance with said beat-voltage.

4. In a bonding apparatus, an oscillator, a load comprising plies of material of varying thickness moving between electrodes, conductor means for transferring current from said oscillator to said load, adjustable reactance tuning means at the load for establishing a rising current-thickness characteristic for the load, inductive pick-up means for deriving a voltage proportional to the current to the load, oscillator means for generating a stable reference voltage of fixed frequency, transformer means for combining predetermined components of said derived and said reference voltages, rectifier means for obtaining a beat-voltage from said combined components, and means for modulating the amplitude of the output voltage of said oscillator at a radio frequency rate in accordance with said beat-voltage.

CHARLES P. SWEENY.

REFERENCES CITED

The following references are of record in the file of this patent:

UNITED STATES PATENTS

| Number | Name | Date |
|---|---|---|
| 2,251,277 | Hart et al. | Aug. 5, 1941 |
| 2,322,884 | Roetken | June 29, 1943 |